United States Patent [19]
Yesel

[11] Patent Number: 5,574,643
[45] Date of Patent: Nov. 12, 1996

[54] TRACTION CONTROL FOR A MACHINE WITH ELECTRONIC ENGINE AND TRANSMISSION CONTROLS

[75] Inventor: Leon P. Yesel, East Peoria, Ill.

[73] Assignee: Caterpillar Inc., Peoria, Ill.

[21] Appl. No.: 275,862

[22] Filed: Jul. 15, 1994

[51] Int. Cl.⁶ ........................................... G06F 7/70
[52] U.S. Cl. ................. 364/426.02; 364/426.03; 364/424.1; 364/426.01; 180/197; 180/240; 192/3.3; 192/3.58; 123/361
[58] Field of Search .............. 364/426.01, 426.02, 364/426.03, 424.1, 424.05, 424.01, 426.04, 431.05; 180/197, 240; 123/361; 303/150, 146; 280/91; 477/185, 169, 174, 36; 192/3.3, 3.58

[56] References Cited

U.S. PATENT DOCUMENTS

| | | | |
|---|---|---|---|
| 4,825,367 | 4/1989 | Nagaoka et al. | 364/426.03 |
| 5,184,298 | 2/1993 | Imaseki et al. | 364/424.05 |
| 5,238,081 | 8/1993 | Maeda et al. | 364/426.03 |
| 5,241,479 | 8/1993 | Matsuda et al. | 364/426.03 |
| 5,249,851 | 10/1993 | Johnsen | 364/426.03 |
| 5,333,108 | 7/1994 | Hessmert et al. | 364/426.03 |
| 5,406,486 | 4/1995 | Kamio et al. | 364/426.03 |

*Primary Examiner*—Kevin J. Teska
*Assistant Examiner*—Jacques H. Louis-Jacques
*Attorney, Agent, or Firm*—John L. James

[57] ABSTRACT

A traction control for a machine calculates percent slip for the wheels and controls operation the differential lock and the throttle control. It turns both the differential lock and throttle control off when percent slip is less than a slip minimum value, turns the differential lock on and the throttle control off when percent slip is equal to or greater than the slip minimum value and equal to or less than a slip maximum value, and turns both the differential lock and throttle control on when percent slip is greater than the slip maximum value.

8 Claims, 4 Drawing Sheets

FIG. 4
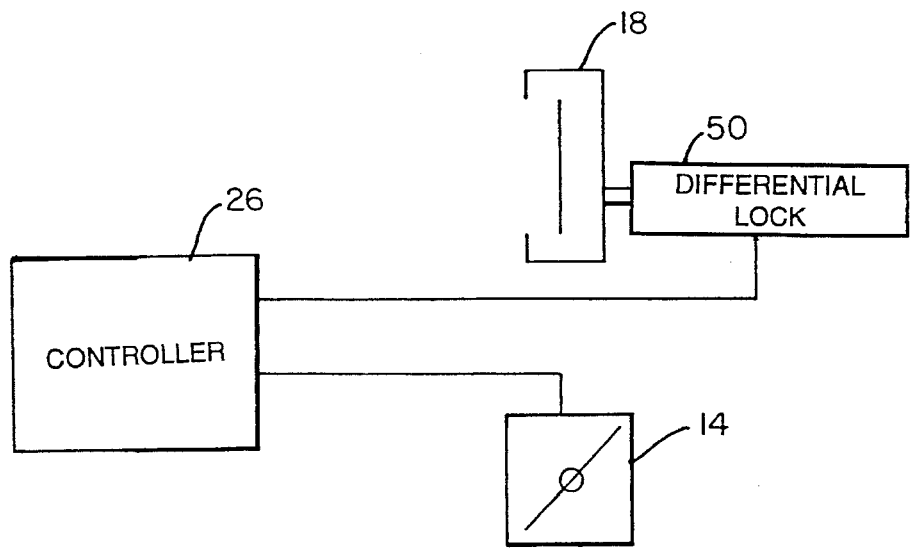
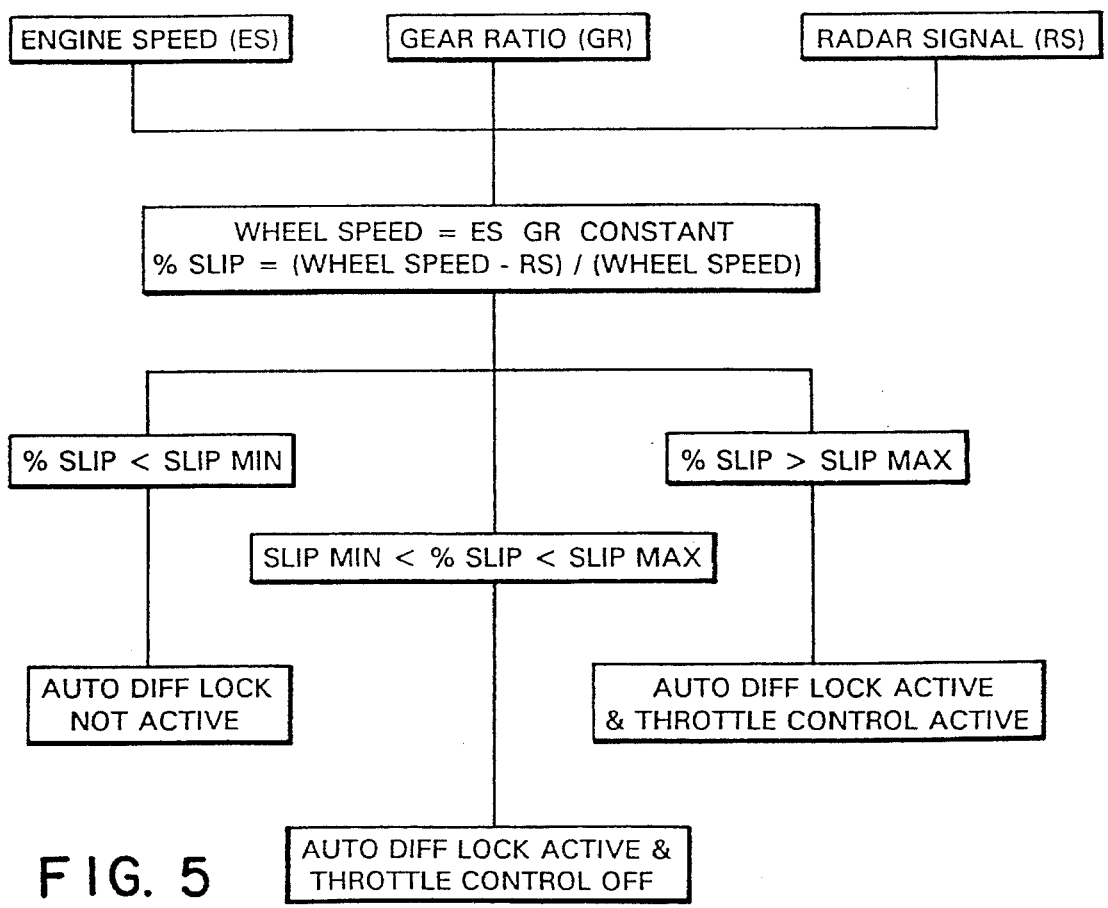
FIG. 5

TRACTION CONTROL FOR A MACHINE WITH ELECTRONIC ENGINE AND TRANSMISSION CONTROLS

TECHNICAL FIELD

The present invention pertains to a machine having an engine and electronically controlled transmission, and, more particularly, to a traction control method and apparatus.

BACKGROUND OF THE INVENTION

In a machine, such as a motor grader, for example, an engine and a transmission work together to propel the machine and operate implements, such as a motor grader blade. A gear shift lever is used to select a gear for operating the machine from among a number of forward and reverse gears. Because motor graders are used for grading operations, they often work in loose materials which give rise to poor traction conditions. Poor traction conditions can cause the wheels to slip which is undesirable. Because the drive wheels are differentially geared, when one wheel loses traction, its wheel speed increases and the differential system may experience an overspeed condition. Accordingly, it will be appreciated that it will be highly desirable to controllably respond to slip by controlling engine and transmission speed or by limiting differential gearing.

DISCLOSURE OF THE INVENTION

The present invention is directed to overcoming the problem set forth above. A machine comprises a frame, wheels mounted on the frame, an engine mounted on the frame and operable at an engine speed, an engine throttle control operable between an off condition at which engine speed is unaffected and an on condition at which engine speed is controlled, a transmission mounted on the frame and coupled to the engine and operable at a gear ratio, a transmission control for controlling operation of the transmission and effecting the gear ratio, a differential gear assembly coupled to the transmission for turning the wheels and propelling the machine at a ground speed, and a differential gear lock operable between an off condition at which wheel turning is unaffected so that wheels turn differentially and an on condition at which wheel turning is affected so that all drive wheels turn at same speed. The machine includes means for determining the ground speed of the machine, means for calculating percent slip for the wheels and means for controlling operation of the differential lock and the throttle control and turning the differential lock off when percent slip is less than a slip minimum value, turning the differential lock on and the throttle control off when percent slip is equal to or greater than the slip minimum value and equal to or less than a slip maximum value, and turning the differential lock on and the throttle control on when percent slip is greater than the slip maximum value.

According to another aspect of the invention, a method is provided for controlling traction of a machine having wheels, an engine, an electronic engine throttle control, a transmission coupled to the engine and operable at a gear ratio, an electronic transmission control, a differential gear assembly having a lock and being coupled to the transmission for turning the wheels and propelling the machine. The method comprises measuring a ground speed of the machine, measuring engine speed, determining a final drive reduction ratio of the machine, calculating percent slip of the wheels using the ground speed, engine speed, gear ratio and final drive reduction ratio; and controlling operation the differential lock and the throttle control and turning the differential lock off when percent slip is less than a slip minimum value, turning the differential lock on and the throttle control off when percent slip is equal to or greater than the slip minimum value and equal to or less than a slip maximum value, and turning the differential lock on and the throttle control on when percent slip is greater than the slip maximum value.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 is a diagram showing the engine throttle control and differential lock and their relation to the transmission controller.

FIG. 5 is a diagram showing how slip is determined and used to control the engine throttle and differential lock of FIG. 4.

BEST MODE FOR CARRYING OUT THE INVENTION

Figure 1:
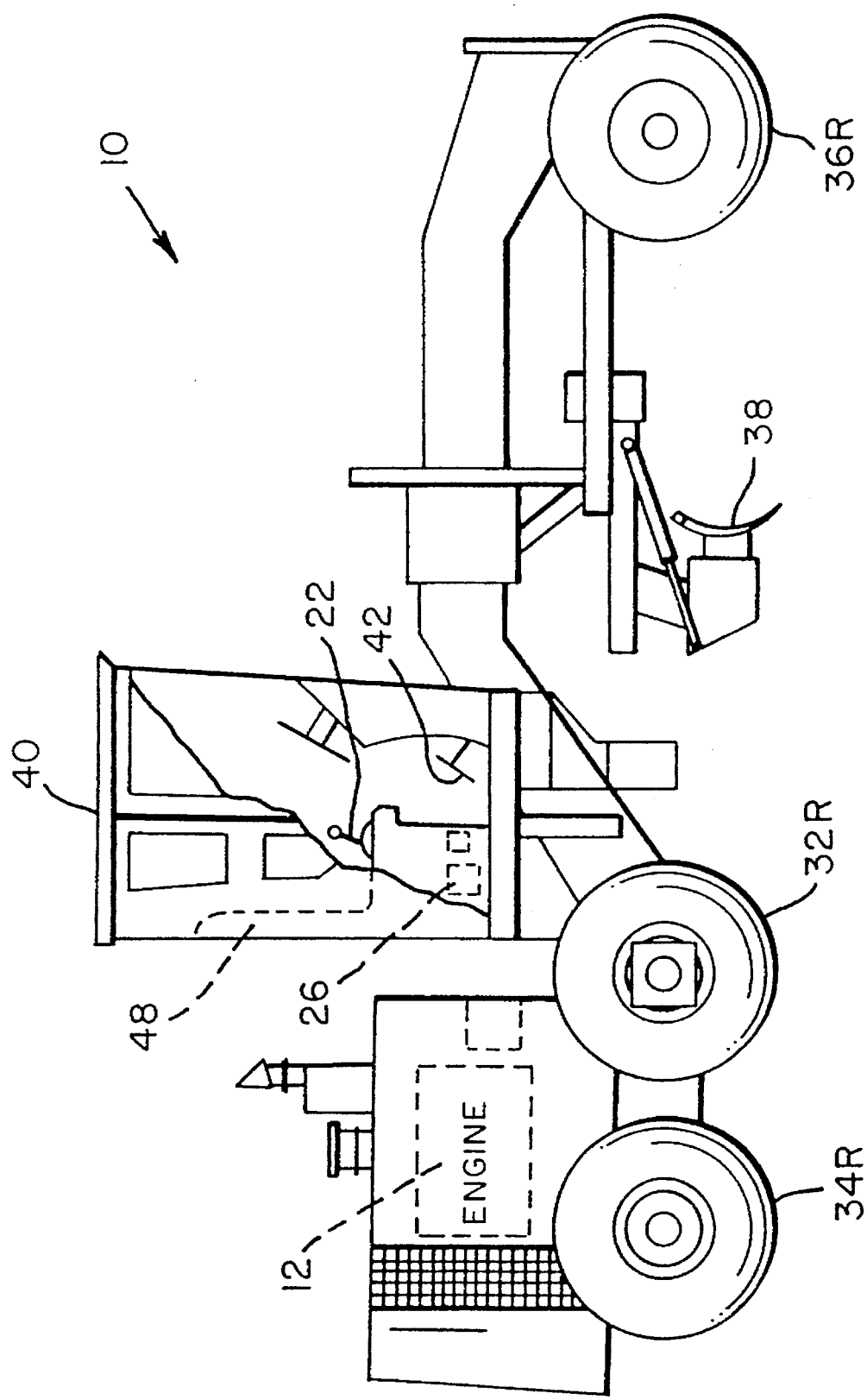
FIG. 1 a diagrammatic side elevational view of a preferred embodiment of a motor grader constructed for operation in accordance with the present invention.
Figure 2:
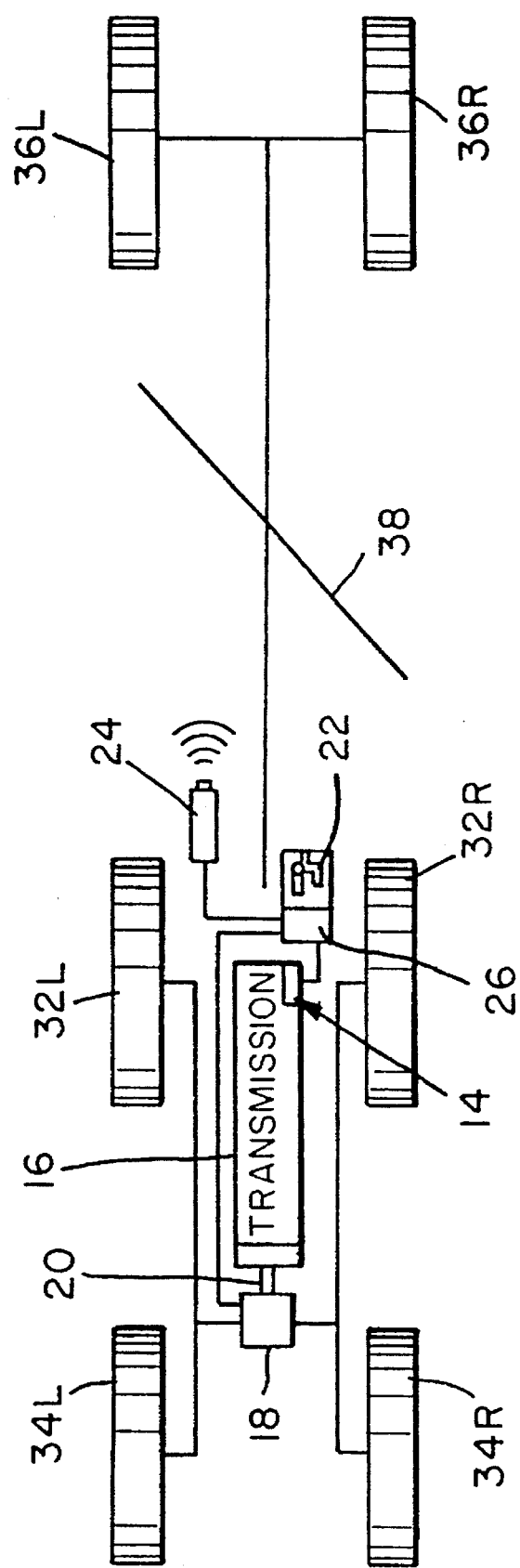
FIG. 2 is a diagrammatic plan view of the motor grader of FIG. 1.
Figure 3:
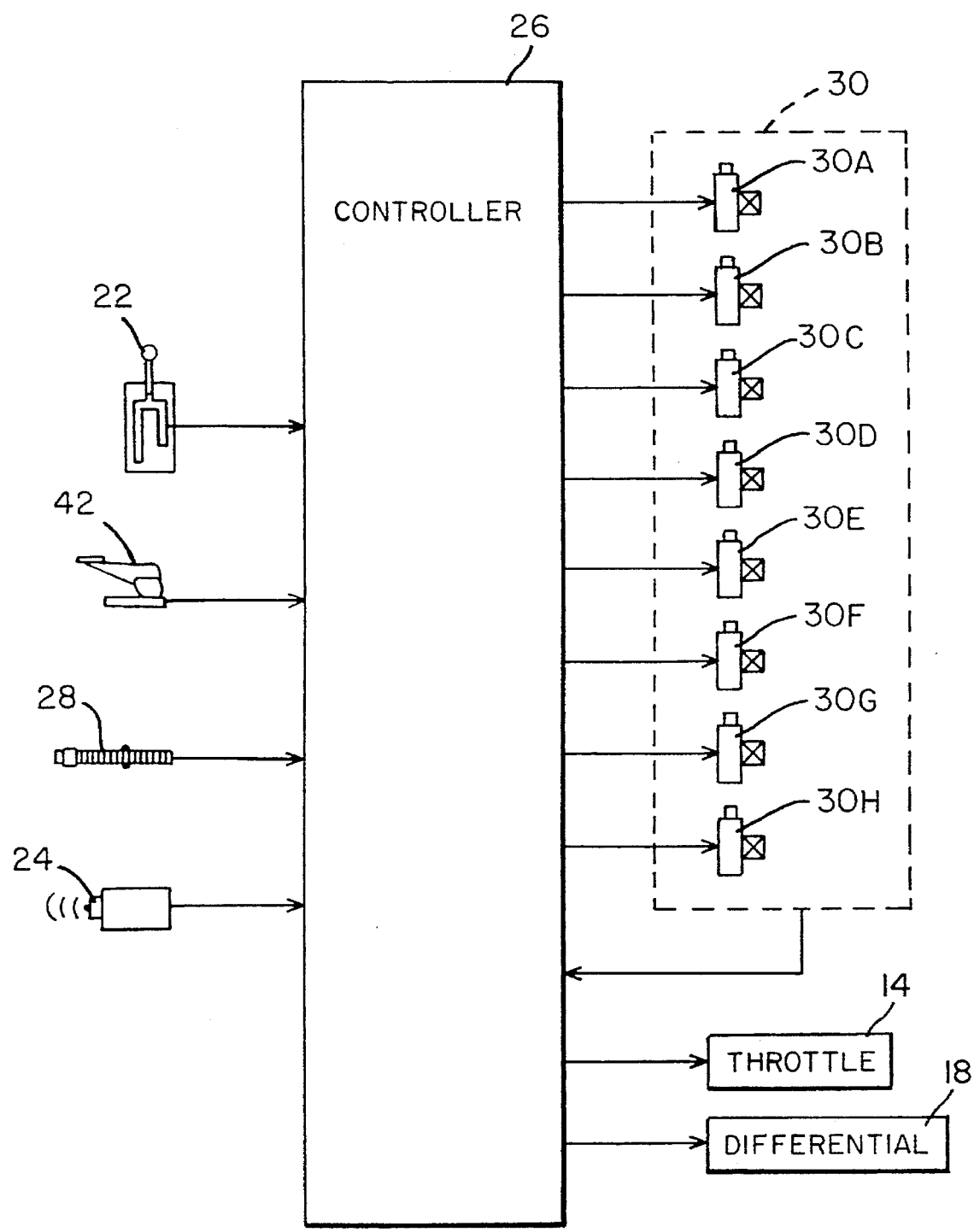
FIG. 3 is a schematic block diagram of the transmission controller of the motor grader of FIG. 1.

Referring to FIGS. 1–3, a machine such as a motor grader 10, has an engine 12 with an engine throttle control 14 for racking the engine and controlling engine speed. A transmission 16 is coupled to the engine 12 and coupled to a differential gearing system 18 by a transmission output shaft 20. The transmission output may be measured in terms of the speed of rotation of its output shaft in rpm. A shift lever 22 is associated with the transmission for shifting the transmission between its various gears which may include a neutral gear as well as 8 forward and 6 reverse gears.

As illustrated, ground speed is measured by a ground speed sensor, such as a radar unit 24. The radar unit 24 is advantageous in that it gives a true indication of ground speed that is independent of slip. While the radar sensor is preferred, other sensors could be used to determine ground speed of the motor grader.

The transmission shift control lever 22 is a multicontact switch that sends position information to a controller 26 to indicate a desired gear for the transmission 16. When the transmission speed, as indicated by a transmission output shaft sensor 28, and the engine speed permit a shift to the desired gear, the controller 26 operates appropriate ones of the transmission solenoids 30. Eight transmission solenoids are illustrated and labeled SA through SH. As is known in the art, the transmission solenoids 30 operate the transmission clutches and thereby determine the actual gear of the transmission.

The differential gear drives the rear wheels 32L, 32R, 34L, 34R, with the left wheels 32L, 34L connected in tandem by chains and the right wheels 32R, 34R also connected by chains in tandem. A pair of steering wheels 36L, 36R are located at the front of the motor grader. The blade 38 of the motor grader is located between the front and rear wheels.

Various operator controls are located in an operator's compartment 40. These controls include the transmission shift lever 22 and inching pedal 42. The controller 26 may be conveniently located under the operator's seat 48. The controller 26 is a microprocessor based electronic module that receives information from the shift lever 22, the inching pedal 42, the transmission output speed sensor 28 and the radar unit 24. The controller 26 actuates appropriate ones of the solenoids 30A–30H for shifting the transmission 16 to the desired gear. The controller 26 also controls the engine throttle control 14 and locks and unlocks the differential 18.

Referring to FIG. 4, the differential gear assembly 18 is locked and unlocked by a differential lock 50 under the control of the transmission controller 26. In the unlocked position, the differential gear assembly 18 operates normally to allow one wheel to spin faster than another. In the locked position, the differential gear assembly 18 forces all drive wheels to turn at the same speed. The throttle control 14 is also under the control of the controller 26 and is operable between an active and an inactive condition. In the inactive condition, engine speed is responsive to the accelerator pedal of the machine. In the active condition, the throttle control 14 determines engine speed.

Referring to FIG. 5, information regarding engine speed, gear ratio, and ground speed are input to the controller 26 which calculates wheel speed. Wheel speed is the product of engine speed, gear ratio and a constant. The constant is primarily a function of the final drive reduction ratio taking into the effect of tires and other less significant variables. While the present invention uses radar for sensing ground speed, other means of determining ground speed may also be used. Radar is preferred because radar is believed to be the most accurate. Alternatively, front wheel speed could be used to determine machine speed.

Slip is determined using wheel speed and ground speed. Slip is defined as the sum of wheel speed minus the ground speed divided by wheel speed as represented by the formula $$\%SLIP=(WS-GS)/WS.$$

In the slip formula, GS is ground speed, WS is wheel speed, and $$WS=(ES)(GR)(C).$$

In the wheel speed formula ES is engine speed, GR is gear ratio, and C is a constant representing final drive ratio.

The present invention provides better traction control by automatically locking up the differential and limiting engine speed under certain conditions of slip. At slip less than 10%, the differential lock would not be activated by the controller nor would the throttle control be activated by the controller. Ten percent would then be considered the minimum slip, and at the opposite end of the slip range, 25% would be considered maximum slip. Above 25% slip, the throttle control would be activated and the differential lock would also be activated by the controller. Between the conditions of minimum slip and maximum slip, the throttle control would not be activated but the differential lock would be activated to control traction.

While the traction control has been described with reference to a rear wheel drive machine, it is equally applicable to an all wheel drive machine. At minimum slip, there would be no need to effect operation of the front drive wheels. Above minimum slip, the controller could also control pump pressure in the front drive wheels to control the traction.

INDUSTRIAL APPLICABILITY

Operation of the present invention is believed to be apparent from the foregoing description and drawings, but a few words will be added for emphasis. The traction control operates automatically without operator intervention to controllably respond to slip by controlling the engine and therefore transmission speed or by locking the differential to limit differential gearing thereby forcing the wheels to turn at the same speed or both depending on the amount of slip.

As is evident from the foregoing description, certain aspects of the invention are not limited to the particular details of the examples illustrated, and it is therefore contemplated that other modifications and applications will occur to those skilled in the art. While the invention has been described with reference to a motor grader, it is apparent that the traction control is easily adapted to other machines that are subject to slip. It is also apparent that the minimum and maximum slip values may be adjusted for varying footing conditions. It is accordingly intended that the claims shall cover all such modifications and applications as do not depart from the hue spirit and scope of the invention.

What is claimed is:

1. A machine, comprising:

a frame;

wheels mounted on said frame, said wheels experiencing wheel slip under certain conditions;

an engine mounted on said frame and operable at an engine speed;

an engine throttle control operable between an off condition at which engine speed is unaffected and an on condition at which engine speed is controlled;

a transmission mounted on said frame and coupled to said engine and operable at a gear ratio;

a transmission control for controlling operation of said transmission and effecting said gear ratio;

a differential gear assembly coupled to said transmission for turning said wheels and propelling said machine at a ground speed, said differential gear assembly having a lock operable between an off condition at which wheel turning is unaffected so that wheels turn differentially and an on condition at which wheel turning is affected so that all drive wheels turn at same speed;

means for determining said ground speed of said machine;

means for calculating percent slip for said wheels; and means for controlling operation said differential lock and said throttle control and turning said differential lock off when percent slip is less than a slip minimum value, turning said differential lock on and said throttle control off when percent slip is equal to or greater than said slip minimum value and equal to or less than a slip maximum value, and turning said differential lock on and said throttle control on when percent slip is greater than said slip maximum value.

2. A machine, as set forth in claim 1, wherein said slip minimum value is 10%.

3. A machine, as set forth in claim 1, wherein said slip maximum value is 25%.

4. A machine, as set forth in claim 1, wherein percent slip is determined by the formula $$\%SLIP = (WS - GS)/WS,$$

where:
GS is ground speed,
WS is wheel speed, and $$WS = (ES)(GR)(C),$$

where:
ES is engine speed,
GR is gear ratio, and
C is a constant representing final drive ratio.

5. A method for controlling traction of a machine, said machine having wheels, an engine, an electronic engine throttle control, a transmission coupled to said engine and operable at a gear ratio, an electronic transmission control, and a differential gear assembly having a lock and being coupled to said transmission for mining said wheels and propelling said machine, said method comprising the steps of:

measuring a ground speed of said machine;
measuring engine speed;
determining a final drive reduction ratio of said machine;
calculating percent slip of said wheels using said ground speed, engine speed, gear ratio and final drive reduction ratio; and
controlling operation said differential lock and said throttle control and turning said differential lock off when percent slip is less than a slip minimum value, turning said differential lock on and said throttle control off when percent slip is equal to or greater than said slip minimum value and equal to or less than a slip maximum value, and turning said differential lock on and said throttle control on when percent slip is greater than said slip maximum value.

6. A method, as set forth in claim 5, including setting said slip minimum value to 10%.

7. A method, as set forth in claim 5, including setting said slip maximum value to 25%.

8. A method, as set forth in claim 5, including determining percent slip by the formula $$\%SLIP = (WS - GS)/WS,$$

where:
GS is ground speed,
WS is wheel speed, and $$WS = (ES)(GR)(C),$$

where:
ES is engine speed,
GR is gear ratio, and
C is a constant representing final drive ratio.

\* \* \* \* \*